(12) United States Patent
Liu et al.

(10) Patent No.: US 12,190,656 B2
(45) Date of Patent: Jan. 7, 2025

(54) METHOD FOR VEHICLE DIAGNOSTICS, DIAGNOSTIC CONNECTOR, AND DIAGNOSTIC DEVICE

(71) Applicant: Launch Tech Co., Ltd., Guangdong (CN)

(72) Inventors: Jun Liu, Guangdong (CN); Feihong Xie, Guangdong (CN)

(73) Assignee: Launch Tech Co., Ltd., Guangdong (CN)

(*) Notice: Subject to any disclaimer, the term of this patent is extended or adjusted under 35 U.S.C. 154(b) by 317 days.

(21) Appl. No.: 17/730,547

(22) Filed: Apr. 27, 2022

(65) Prior Publication Data

US 2023/0215226 A1 Jul. 6, 2023

Related U.S. Application Data

(63) Continuation of application No. PCT/CN2021/143352, filed on Dec. 30, 2021.

(51) Int. Cl.
*G07C 5/08* (2006.01)
*H04L 12/40* (2006.01)

(52) U.S. Cl.
CPC ........... *G07C 5/0808* (2013.01); *G07C 5/085* (2013.01); *H04L 12/40097* (2013.01); *H04L 2012/40215* (2013.01); *H04L 2012/40273* (2013.01)

(58) Field of Classification Search
CPC . G07C 5/0808; G07C 5/085; H04L 12/40097; H04L 2012/40215; H04L 2012/40273
See application file for complete search history.

(56) References Cited

U.S. PATENT DOCUMENTS 7,633,888 B1 * 12/2009 Seifer ................ H04L 61/5014
379/900
2004/0083041 A1 4/2004 Skeen et al.
(Continued)

FOREIGN PATENT DOCUMENTS

CN 101430557 A 5/2009
CN 105745939 A 7/2016
(Continued)

OTHER PUBLICATIONS

English language translation of JP2021061537A (Year: 2021).*
(Continued)

*Primary Examiner* — Naeem Taslim Alam
(74) *Attorney, Agent, or Firm* — IP Spring

(57) ABSTRACT

A method for vehicle diagnostics, a diagnostic device, and a non-transitory computer-readable storage medium are provided in the present disclosure. In the method, the diagnostic device obtains a diagnostic request including vehicle information of a vehicle to-be-diagnosed, and determine a communication protocol which is applied in the vehicle to-be-diagnosed according to the vehicle information. After obtaining a diagnostic instruction including a diagnostic function instruction and a communication protocol corresponding to the diagnostic function instruction, the diagnostic device determines a communication link corresponding to the diagnostic function instruction according to the communication protocol corresponding to the diagnostic function instruction, sends the diagnostic function instruction to the vehicle to-be-diagnosed through the communication link corresponding to the diagnostic function instruction, obtains feedback data from the vehicle to-be-diagnosed, and performs diagnostics.

11 Claims, 3 Drawing Sheets

(56) References Cited

U.S. PATENT DOCUMENTS

| | | | |
|---|---|---|---|
| 2005/0182535 A1 | 8/2005 | Huang | |
| 2012/0044527 A1 | 2/2012 | Panko | |
| 2014/0189814 A1* | 7/2014 | Marten | G08G 1/205 726/4 |
| 2015/0071115 A1* | 3/2015 | Neff | H04L 43/12 370/254 |
| 2015/0351137 A1* | 12/2015 | Neff | H04L 67/12 370/329 |
| 2016/0124587 A1* | 5/2016 | Covington | G01R 31/006 345/440 |
| 2019/0188925 A1 | 6/2019 | Calvert et al. | |
| 2019/0312892 A1* | 10/2019 | Chung | G06F 21/554 |
| 2020/0203906 A1 | 6/2020 | Thürmer et al. | |
| 2022/0319255 A1* | 10/2022 | Palai | G07C 5/008 |
| 2023/0122334 A1* | 4/2023 | Kadry | B60R 16/0232 701/29.2 |
| 2024/0053738 A1* | 2/2024 | Wang | B60W 50/0205 |

FOREIGN PATENT DOCUMENTS

| | | |
|---|---|---|
| CN | 106229356 A | 12/2016 |
| CN | 106463860 A | 2/2017 |
| CN | 108199942 A | 6/2018 |
| CN | 109669442 A | 4/2019 |
| CN | 111055589 A | 4/2020 |
| CN | 210478084 U | 5/2020 |
| CN | 210805806 U | 6/2020 |
| CN | 112202884 A | 1/2021 |
| CN | 112635586 A | 4/2021 |
| CN | 112740127 A | 4/2021 |
| CN | 213583811 U | 6/2021 |
| EP | 2755010 A1 | 7/2014 |
| JP | 2021061537 A * | 4/2021 |
| WO | 2018207312 A1 | 11/2018 |

OTHER PUBLICATIONS

CNIPA, International Search Report for International Patent Application No. PCT/CN2021/140577, Mar. 22, 2022, 3 pages.

CNIPA, First Office Action for corresponding Chinese Patent Application No. 202180004399.9, Oct. 10, 2022, 20 pages.

CNIPA, Second Office Action for corresponding Chinese Patent Application No. 202180004399.9, Apr. 13, 2023, 31 pages.

CNIPA, Third Office Action for corresponding Chinese Patent Application No. 202180004399.9, Jul. 3, 2023, 33 pages.

* cited by examiner

METHOD FOR VEHICLE DIAGNOSTICS, DIAGNOSTIC CONNECTOR, AND DIAGNOSTIC DEVICE

CROSS-REFERENCE TO RELATED APPLICATIONS

This application is a continuation under 35 U.S.C. § 120 of International Application No. PCT/CN2021/143352, filed on Dec. 30, 2021, the entire disclosures of which is incorporated herein by reference.

TECHNICAL FIELD

This disclosure relates to the technical field of vehicle diagnostics, and in particular to a method for vehicle diagnostics, a diagnostic connector, and a diagnostic device.

BACKGROUND

With improvement of a degree of vehicle intelligence, a traditional serial communication bus, such as controller area network (CAN), is unable to meet explosive growth of vehicle communication data. Diagnostic communication over Internet protocol (DoIP) has fast data transmission rate, so diagnostic efficiency under a complex diagnostic task can be improved. However, since DoIP is a diagnostic service used over transmission control protocol/Internet protocol (TCP/IP) and Ethernet and introduced over unified diagnostic services (UDS), it is necessary to establish a communication link with a diagnostic device through an external network port of an on-board diagnostics (OBD) diagnostic head when a DoIP service is used. As a result, the DoIP diagnostic service is subject to many restrictions. Therefore, existing vehicle diagnostics still has great limitations.

SUMMARY

In a first aspect, a method for vehicle diagnostics is provided in the present disclosure and is applicable to a diagnostic device. The diagnostic device is included in a vehicle diagnostic system which consists of the diagnostic device, a diagnostic interface, and a diagnostic connector. The diagnostic device is configured to establish a communication connection with the diagnostic connector and establish a communication connection with the diagnostic interface; the diagnostic connector is configured to establish a communication connection with the diagnostic interface; and the diagnostic connector is configured to establish a communication connection with a vehicle to-be-diagnosed. A first communication link is formed between the diagnostic device and vehicle to-be-diagnosed through the diagnostic connector, and a second communication link is formed between the diagnostic device and vehicle to-be-diagnosed through the diagnostic interface and the diagnostic connector. The method includes the following. A diagnostic request is obtained, where the diagnostic request includes vehicle information of the vehicle to-be-diagnosed. A communication protocol which can be applied in the vehicle to-be-diagnosed is determined, according to the vehicle information. A diagnostic instruction is obtained, where the diagnostic instruction includes a diagnostic function instruction and a communication protocol corresponding to the diagnostic function instruction. A communication link corresponding to the diagnostic function instruction is determined, according to the communication protocol corresponding to the diagnostic function instruction. The diagnostic function instruction is sent to the vehicle to-be-diagnosed through the communication link corresponding to the diagnostic function instruction, feedback data is obtained from the vehicle to-be-diagnosed, and diagnostics is performed.

In a second aspect, a diagnostic device is provided in implementations of the present disclosure and includes a first communication port and a second communication port. The diagnostic device is included in a vehicle diagnostic system which consists of the diagnostic device, a diagnostic interface, and a diagnostic connector, the diagnostic interface includes a third communication port and a fourth communication port, and the diagnostic connector comprises a fifth communication port, a sixth communication port, and a seventh communication port. The diagnostic device is configured to establish a communication connection with a diagnostic connector through the first communication port and the fifth communication port of the diagnostic connector, and the diagnostic device is configured to establish a communication connection with the diagnostic interface through the second communication port and the fourth communication port of the diagnostic interface; the diagnostic connector is configured to establish a communication connection with the diagnostic interface through the sixth communication port of the diagnostic connector and the third communication port of the diagnostic interface, and the diagnostic connector is configured to establish a communication connection with a vehicle to-be-diagnosed through the seventh communication port of the diagnostic connector and an OBD port of the vehicle to-be-diagnosed; a first communication link is formed among the first communication port, the fifth communication port, and the seventh communication port; and a second communication link is formed among the second communication port, the fourth communication port, the third communication port, the sixth communication port, and the seventh communication port. The diagnostic device further includes a memory and a processor. The memory is configured to store a vehicle diagnostic program. When executing the vehicle diagnostic program, the processor is configured to perform the following operations. The processor is configured to obtain a diagnostic request, where the diagnostic request includes vehicle information of the vehicle to-be-diagnosed. The processor is further configured to determine a communication protocol which can be applied in the vehicle to-be-diagnosed according to the vehicle information. The processor is further configured to obtain a diagnostic instruction, where the diagnostic instruction includes a diagnostic function instruction and a communication protocol corresponding to the diagnostic function instruction. The processor is further configured to determine a communication link corresponding to the diagnostic function instruction according to the communication protocol corresponding to the diagnostic function instruction. The processor is further configured to send the diagnostic function instruction to the vehicle to-be-diagnosed through the communication link corresponding to the diagnostic function instruction, obtain feedback data from the vehicle to-be-diagnosed, and perform diagnostics.

In a third aspect, implementations of the present disclosure provide a non-transitory computer-readable storage medium. The non-transitory computer-readable storage medium is configured to store a computer program. The computer program causes a computer to perform instructions for part or all of operations described in the first aspect of implementations of the present disclosure.

BRIEF DESCRIPTION OF THE DRAWINGS

In order to describe technical solutions of implementations of the present disclosure more clearly, the following will give a brief introduction to the accompanying drawings used for describing the implementations or the related art.

DETAILED DESCRIPTION

In the following description, for the purpose of illustration rather than limitation, details such as specific system structures, technologies, and the like are proposed for a thorough understanding of implementations of the present disclosure. In other cases, detailed description of well-known systems, apparatuses, circuits, and methods are omitted to prevent unnecessary details from hindering the description of the present disclosure. It should be understood that in the description of the specification of the present disclosure and the appended claims, terms "first", "second", "third", and the like are only used to distinguish the description and cannot be understood as explicitly or implicitly indicating relative importance.

It should be also understood that reference to "an implementation", "some implementations", or the like described in the specification of the present disclosure indicates that one or more implementations of the present disclosure include a specific feature, structure, or characteristic described with reference to the implementations. Before discussing the exemplary implementations in more detail, it should be mentioned that some exemplary implementations are described as processes or methods illustrated by a flowchart. In the flowchart, although operations (or steps) are depicted as being processed sequentially, many of the operations may be performed in parallel, concurrently, or simultaneously. In addition, the order of the operations can be rearranged. When the operations are completed, the process may be terminated, but there may also be additional steps not included in the accompanying drawings. The process may correspond to a method, a function, a procedure, a subroutine, a subprogram, and the like.

Figure 1:
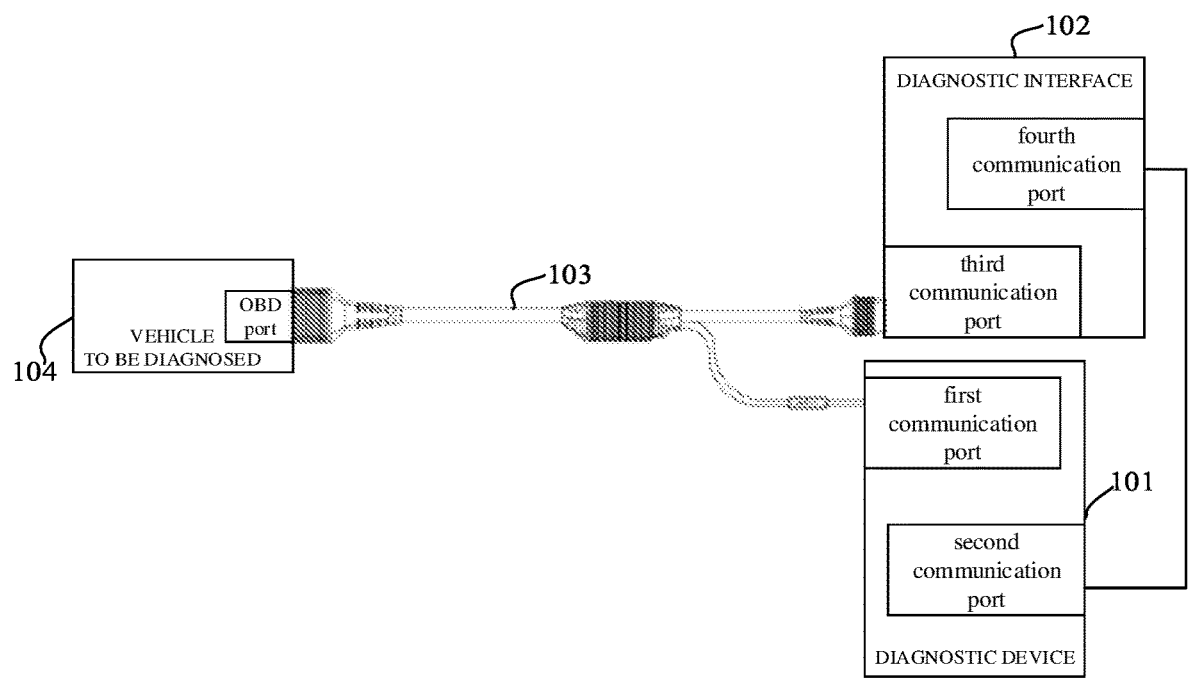
FIG. 1 is a schematic view illustrating a vehicle diagnostic system provided in the implementations of the present disclosure.

Reference can be made to FIG. 1, which is a schematic view illustrating a vehicle diagnostic system provided in the implementations of the present disclosure. It can be known from FIG. 1 that a vehicle diagnostic system 10 provided in the implementations of the present disclosure includes a diagnostic device 101, a diagnostic interface 102, and a diagnostic connector 103. The diagnostic device 101 includes a first communication port and a second communication port, the diagnostic interface 102 includes a third communication port and a fourth communication port, and the diagnostic connector 103 includes a fifth communication port, a sixth communication port, and a seventh communication port.

The diagnostic connector 103 is configured to establish a communication connection with the diagnostic device 101 through the fifth communication port and the first communication port. The diagnostic connector 103 is configured to establish a communication connection with the diagnostic interface 102 through the sixth communication port and the third communication port. The diagnostic connector 103 is configured to establish a communication connection with a vehicle to-be-diagnosed 104 through the seventh communication port and an on-board diagnostics (OBD) port of the vehicle to-be-diagnosed 104. The diagnostic interface 102 is configured to establish a communication connection with the diagnostic device 101 through the fourth communication port and the second communication port. A first communication link is formed among the first communication port, the fifth communication port, and the seventh communication port. A second communication link is formed among the second communication port, the fourth communication port, the third communication port, the sixth communication port, and the seventh communication port. The diagnostic device 101 is configured to obtain a diagnostic request including vehicle information of the vehicle to-be-diagnosed 104, and determine a communication protocol which can be applied in the vehicle to-be-diagnosed 104 according to the vehicle information. After obtaining a diagnostic instruction including a diagnostic function instruction and a communication protocol corresponding to the diagnostic function instruction, the diagnostic device 101 is further configured to determine a communication link corresponding to the diagnostic function instruction according to the communication protocol corresponding to the diagnostic function instruction, send the diagnostic function instruction to the vehicle to-be-diagnosed 104 through the communication link corresponding to the diagnostic function instruction, obtain feedback data from the vehicle to-be-diagnosed 104, and perform diagnostics.

The diagnostic device 101 may be a server or a terminal. The server may be a single server or a server cluster, and the terminal may be a handheld device, a personal computer, a notebook computer, a robot, or a wearable intelligent device. The first communication port and the second communication port may be wireless communication ports or wired communication ports.

The diagnostic connector 103 is a communication connector which may support a diagnostic communication over Internet protocol (DoIP) communication protocol or a controller area network (CAN) communication protocol, and the fifth communication port may be a universal serial bus (USB) communication port. The diagnostic connector 103 can establish a communication connection with the first communication port of the diagnostic device 101 through the USB communication port, to be coupled with a USB bus of the diagnostic device 101. The seventh communication port may be a category 5 cable (Cat 5) communication port of Ethernet, and the Cat 5 communication port of Ethernet may be coupled with the OBD port of the vehicle to-be-diagnosed 104 through a cable to form the first communication port. Exemplarily, a network card is disposed between the fifth communication port and the seventh communication port. The network card is coupled with a system bus of the diagnostic device 101 through the fifth communication port and the first communication port of the diagnostic device 101 and the network card is coupled with the OBD port of the vehicle to-be-diagnosed 104 through the seventh communication port, to form the first communication link. The system bus may be, for example, a USB bus.

In some implementations, through a USB On-the-Go (USB OTG) mechanism, an external USB network card of the diagnostic device 101 may be added in the communication connector which supports the DoIP communication protocol and a USB network card driver may be built in a core of the diagnostic device 101, to form the first communication link among the first communication port, the fifth communication port, and the seventh communication port.

In some implementations, the diagnostic interface 102 is configured to establish the communication connection with the diagnostic device 101 through the fourth communication port and the second communication port. The fourth communication port and the second communication port may be wireless communication ports, such as wireless fidelity (WiFi) ports, Bluetooth ports, or wired hardware ports. Based on a connection between communication ports, a wireless communication connection or a wired communication connection can be established between the diagnostic interface 102 and the diagnostic device 101.

The diagnostic interface 102 may be an OBD diagnostic interface, which includes the first communication port coupled with the fifth communication port of the diagnostic connector 103 and the second communication port coupled with the fourth communication port of the diagnostic device 101. It should be understood that after the seventh communication port of the diagnostic connector 103 establishes a communication connection with the OBD port of the vehicle to-be-diagnosed 104, the first communication link is formed among the first communication port, the fifth communication port, and the seventh communication port, and the second communication link is formed among the second communication port, the fourth communication port, the third communication port, the sixth communication port, and the seventh communication port. The diagnostic device 101 can perform diagnostics on the vehicle to-be-diagnosed 104 through the first communication link and/or the second communication link, which can effectively solve limitations in a process of vehicle diagnostics and improve adaptability of vehicle diagnostics.

In some implementations, a communication protocol which can be applied in the vehicle to-be-diagnosed 104 includes the CAN communication protocol and/or the DoIP communication protocol. Exemplarily, when the diagnostic instruction obtained by the diagnostic device 101 includes one diagnostic function instruction, that is, when the diagnostic function instruction is implemented as one diagnostic function instruction, the diagnostic device 101 configured to determine the communication link corresponding to the diagnostic function instruction according to the communication protocol corresponding to the diagnostic function instruction is configured to perform the following operations. The diagnostic device 101 is configured to determine the communication link corresponding to the diagnostic function instruction to be the first communication link when the communication protocol corresponding to the diagnostic function instruction is the DoIP communication protocol, in this case, the diagnostic device 101 configured to send the diagnostic function instruction to the vehicle to-be-diagnosed 104 through the communication link corresponding to the diagnostic function instruction is specifically configured to send the diagnostic function instruction to the vehicle to-be-diagnosed 104 through the first communication link. The diagnostic device 101 is further configured to determine the communication link corresponding to the diagnostic function instruction to be the second communication link when the communication protocol corresponding to the diagnostic function instruction is the CAN communication protocol, in this case, the diagnostic device 101 configured to send the diagnostic function instruction to the vehicle to-be-diagnosed 104 through the communication link corresponding to the diagnostic function instruction is specifically configured to send the diagnostic function instruction to the vehicle to-be-diagnosed 104 through the second communication link.

Exemplarily, when the diagnostic function instruction supports both the CAN communication protocol and the DoIP communication protocol, the diagnostic device 101 is configured to determine the communication link corresponding to the diagnostic function instruction to be the first communication link if the diagnostic function instruction needs online resource support of a server, and determine the communication link corresponding to the diagnostic function instruction to be the second communication link if the diagnostic function instruction needs no online resource support of the server. In this case, the diagnostic device 101 configured to send the diagnostic function instruction to the vehicle to-be-diagnosed 104 through the communication link corresponding to the diagnostic function instruction is specifically configured to send the diagnostic function instruction to the vehicle to-be-diagnosed 104 through a determined communication link. According to diagnostic function instructions supporting different communication protocols, corresponding communication links are selected to perform vehicle diagnostics, such that efficiency of vehicle diagnostics is effectively improved.

In some implementations, when the diagnostic function instruction is implemented as two diagnostic function instructions, a communication protocol corresponding to a first diagnostic function instruction is the DoIP communication protocol, and a communication protocol corresponding to a second diagnostic function instruction is the CAN communication protocol. The diagnostic device 101 configured to determine the communication link corresponding to the diagnostic function instruction according to the communication protocol corresponding to the diagnostic function instruction is specifically configured to assign the first communication link to a communication link corresponding to the first diagnostic function instruction, and assign the second communication link to a communication link corresponding to the second diagnostic function instruction. The diagnostic device 101 configured to send the diagnostic function instruction to the vehicle to-be-diagnosed 104 through the communication link corresponding to the diagnostic function instruction is specifically configured to send the first diagnostic function instruction to the vehicle to-be-diagnosed 104 through the first communication link, and send the second diagnostic function instruction to the vehicle to-be-diagnosed 104 through the second communication link. Through two communication links supporting different communication protocols, different diagnostic function instructions are sent to the vehicle to-be-diagnosed, such that efficiency of vehicle diagnostics is improved.

In some implementations, when the diagnostic function instruction is implemented as two diagnostic function instructions and diagnostic function instructions each support the CAN communication protocol and the DoIP communication protocol, and the diagnostic device 101 configured to determine the communication link corresponding to the diagnostic function instruction according to the communication protocol corresponding to the diagnostic function instruction is specifically configured to perform the following operations. The diagnostic device 101 is configured to determine a diagnostic function instruction needing online resource support of a server to be a third diagnostic function instruction, and determine a diagnostic function instruction needing no online resource support of the server to be a fourth diagnostic function instruction. The diagnostic device 101 is further configured to assign the first communication link to a communication link corresponding to the third diagnostic function instruction, and assign the second communication link to a communication link corresponding to the fourth diagnostic function instruction. The diagnostic device 101 configured to send the diagnostic function instruction to the vehicle to-be-diagnosed 104 through the communication link corresponding to the diagnostic function instruction is specifically configured to send the third diagnostic function instruction to the vehicle to-be-diagnosed 104 through the first communication link, and send the fourth diagnostic function instruction to the vehicle to-be-diagnosed 104 through the second communication link. The diagnostic function instruction needing online resource support of the server and the diagnostic function instruction needing no online resource support of the server are sent through different communication links, such that efficiency of vehicle diagnostics is effectively improved.

In some implementations, the network card is disposed between the fifth communication port and the seventh communication port, and the network card is coupled with the system bus of the diagnostic device 101 through the fifth communication port and the first communication port and the network card is coupled with the OBD port of the vehicle to-be-diagnosed 104 through the seventh communication port, to form the first communication link.

In some implementations, data can be transmitted between the fifth communication port and the seventh communication port of the diagnostic connector 103 through a first pin, a twelfth pin, and a thirteenth pin of a vehicle OBD port. In other words, the first pin, the twelfth pin, and the thirteenth pin of the vehicle OBD port are used by the diagnostic device 101. Data can be transmitted between the sixth communication port and the seventh communication port of the diagnostic connector 103 through a sixth pin and a fourteenth pin of the vehicle OBD port. In other words, the sixth pin and the fourteenth pin of the vehicle OBD port are used by the diagnostic interface 102. Therefore, simultaneous operation of a CAN protocol and a DoIP protocol is realized, limitations of using diagnostic protocols in a process of vehicle diagnostics are reduced, and adaptability of vehicle diagnostics is improved.

It should be understood that in order to form the first communication link, the network card needs to be driven to be effective first, and an Internet protocol (IP) address of the network card and an IP address of the vehicle to-be-diagnosed are on a same network segment. Therefore, the method further includes the following operations. Before the diagnostic function instruction is sent to the vehicle to-be-diagnosed through the first communication link, a dynamic host configuration protocol (DHCP) service or an auto Internet protocol (AUTO-IP) service is activated once the network card is monitored to be driven to be effective, and the IP address of the network card and the IP address of the vehicle to-be-diagnosed are assigned through the DHCP service or the AUTO-IP service, where the IP address of the network card and the IP address of the vehicle to-be-diagnosed are on the same network segment.

Specifically, the DHCP service or the AUTO-IP service is activated, once the network card is monitored to be driven to be effective as follows. A DoIP network-control-service function built in the diagnostic device is invoked to monitor a state of the network card. A broadcast which is indicative of activating the DHCP service or the AUTO-IP service is sent to the DoIP network-control-service function, once the network card is monitored to be driven to be effective. The DoIP network-control-service function is invoked to activate the DHCP service or the AUTO-IP service.

Specifically, upon the network card being driven to be effective, registration success information of the network card is generated on the diagnostic device. Upon detecting the registration success information of the network card through the DoIP network-control-service function, the diagnostic device assigns a default website address to the network card and establishes a routing table. Furthermore, the diagnostic device sends a broadcast which is indicative of activating the DHCP service to the DoIP network-control-service function.

It should be understood that an IP address is needed to activate the DHCP service itself, and after the diagnostic connector is coupled, and a vehicle DoIP node will apply to the DHCP service for an IP address and usually try to be coupled for three times. If the vehicle DoIP node is coupled successfully, the diagnostic device uses the DHCP service to assign the IP address of the vehicle DoIP node, such that the network card and the vehicle DoIP node are on the same network segment. If the vehicle DoIP node fails to apply to the DHCP service for the IP address, the vehicle DoIP node will assign an IP address to itself according to the AUTO-IP protocol. In this case, the diagnostic device and the vehicle DoIP node are not on the same network segment, and the diagnostic device fails to perform data communication with the vehicle to-be-diagnosed through the DoIP communication protocol. In addition, after failure, the diagnostic device stops the DHCP service and activate the AUTO-IP service, and also assigns an IP address to the network card according to the AUTO-IP protocol, such that the network card and the vehicle DoIP node are on the same network segment.

It should be understood that the diagnostic device is simultaneously provided with two network devices, which are a wireless network card and a network card externally coupled with the diagnostic connector respectively, therefore, the network card externally coupled with the diagnostic connector must be configured with the routing table, such that DoIP protocol data can be transmitted through this external network card.

It should be understood that after the DoIP network-control-service function is invoked to activate the DHCP service or the AUTO-IP service, a DoIP diagnostic function may also be displayed in a visualization region.

It should be understood that if the network card fails to drive, the DHCP service or the AUTO-IP service is not needed to activate. Correspondingly, in the implementations, once driving failure of the network card is monitored, a broadcast which is indicative of stopping the DHCP service or the AUTO-IP service is sent to the DoIP network-control-service function, and the DoIP network-control-service function is invoked to stop the DHCP service or the AUTO-IP service.

It should be noted that in the present disclosure, an Android broadcast mechanism is adopted to invoke a DoIP network-control-service function built in Android system. But not limited to this manner, the DoIP network-control-service function built in Android system may also be invoked through a basic binder mechanism.

It can be seen from the above analysis that in the vehicle diagnostic system provided in the implementations of the present disclosure, the first communication link and the second communication link which support multiple communication protocols are formed between the vehicle to-be-diagnosed and the diagnostic device through the diagnostic connector, such that after obtaining the diagnostic request including the vehicle information of the vehicle to-be-diagnosed, the diagnostic device can determine the communication protocol which can be applied in the vehicle to-be-diagnosed according to the vehicle information. After obtaining the diagnostic instruction including the diagnostic function instruction and the communication protocol corresponding to the diagnostic function instruction, the diagnostic device can determine the communication link corresponding to the diagnostic function instruction according to the communication protocol corresponding to the diagnostic function instruction, send the diagnostic function instruction to the vehicle to-be-diagnosed through the communication link corresponding to the diagnostic function instruction, obtain the feedback data from the vehicle to-be-diagnosed, and perform diagnostics. The vehicle diagnostic system solves limitations in a process of vehicle diagnostics and aims to improve adaptability of vehicle diagnostics.

Figure 2:
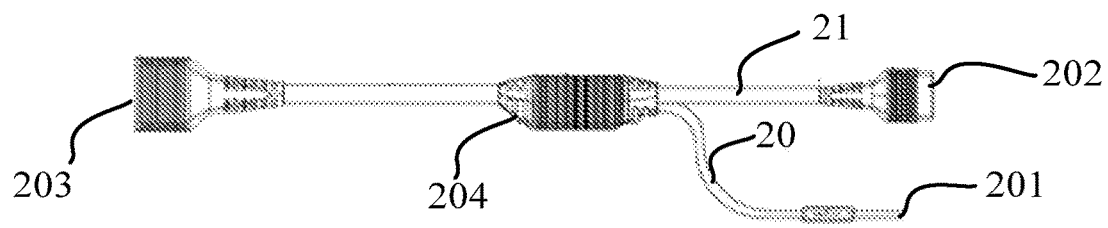
FIG. 2 is a schematic structural view illustrating a diagnostic connector provided in the implementations of the present disclosure.

Exemplarily, reference can be made to FIG. 2, which is a schematic structural view illustrating the diagnostic connector in FIG. 1. It should be understood that the diagnostic connector 103 provided in the implementations is applicable to the vehicle diagnostic system illustrated in FIG. 1. It can be seen from FIG. 1 that the vehicle diagnostic system 10 includes the diagnostic device 101, the diagnostic connector 102, and the diagnostic connector 103 illustrated in FIG. 2. It can be seen from FIG. 1 that the diagnostic connector 101 includes the first communication port and the second communication port, and the diagnostic interfere 102 includes the third communication port and the fourth communication port. It can be seen from FIG. 2 that the diagnostic connector 103 includes the fifth communication port 201, the sixth communication port 202, and the seventh communication port 203. The diagnostic connector 103 is configured to establish a communication connection with the diagnostic device 101 through the fifth communication port 201 and the first communication port. The diagnostic connector 103 is configured to establish a communication connection with the diagnostic interface 102 through the sixth communication port 202 and the third communication port. The diagnostic connector 103 is configured to establish a communication connection with the vehicle to-be-diagnosed 104 through the seventh communication port 203 and the OBD port of the vehicle to-be-diagnosed 104. The diagnostic interface 102 is configured to establish a communication connection with the diagnostic device 101 through the fourth communication port and the second communication port. A first communication link 20 is formed among the first communication port, the fifth communication port 201, and the seventh communication port 203. A second communication link 21 is formed among the second communication port, the fourth communication port, the third communication port, the sixth communication port 202, and the seventh communication port 203. The first communication link 20 and the second communication link 21 can be simultaneously used for vehicle diagnostics, such that efficiency of vehicle diagnostics is improved.

In some implementations, when a communication protocol corresponding to a diagnostic function instruction sent by the diagnostic device 101 is a DoIP communication protocol, the diagnostic connector 103 is configured to send the diagnostic instruction to the vehicle to-be-diagnosed 104 through the first communication link 20. When a communication protocol corresponding to the diagnostic function instruction sent by the diagnostic device 101 is a CAN communication protocol, the diagnostic connector 103 is configured to send the diagnostic instruction to the vehicle to-be-diagnosed 104 through the second communication link 21. The diagnostic function instruction is obtained by the diagnostic device 101 and is for diagnosing the vehicle to-be-diagnosed 104. The first communication link and the second communication link support different diagnostic protocols, such that efficiency of vehicle diagnostics can be effectively improved.

It should be understood that the first communication port and the second communication port each are communication ports of the diagnostic device 101, and the third communication port and the fourth communication port each are communication ports of the diagnostic interface 102.

In some implementations, reference can be made to FIG. 2, a network card 204 is disposed between the fifth communication port 201 and the seventh communication port 203, and the network card 204 is coupled with a system bus of the diagnostic device 101 through the fifth communication port 201 and the first communication port and the network card 204 is coupled with the OBD port of the vehicle to-be-diagnosed 104 through the seventh communication port 203, to form the first communication link 20, such that the first communication link 20 supports the DoIP communication protocol. Through the first communication link 20, the diagnostic function instruction supporting the DoIP communication protocol can be completed, such that adaptability of vehicle diagnostics to the communication protocol is improved.

Figure 3:
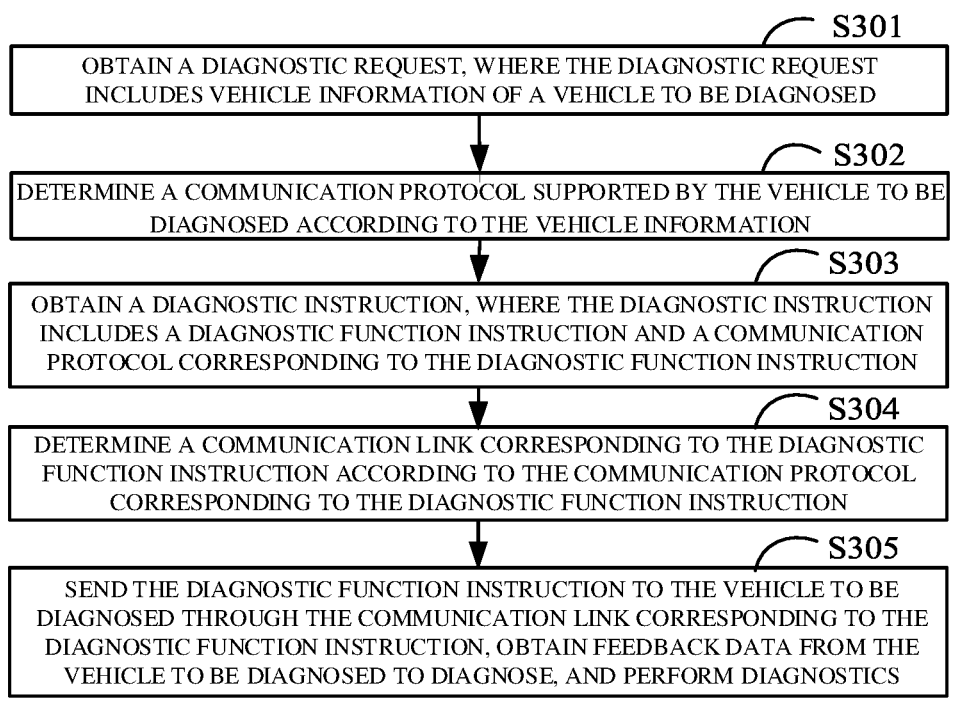
FIG. 3 is an implementation flowchart illustrating a method for vehicle diagnostics provided in the implementations of the present disclosure.

Reference can be made to FIG. 3, which is an implementation flowchart illustrating a method for vehicle diagnostics provided in the implementations of the present disclosure. The method for vehicle diagnostics provided in the implementations is performed by the diagnostic device 101 illustrated in FIG. 1.

Specifically, it can be seen from FIG. 1 that the diagnostic device 101 includes the first communication port and the second communication port, the diagnostic device 101 establishes a communication connection with the diagnostic connector 103 through the first communication port and the fifth communication port of the diagnostic connector 103, and the diagnostic device 101 establishes a communication connection with the diagnostic interface 102 through the second communication port and the fourth communication port of the diagnostic interface 102. The diagnostic connector 103 establishes a communication connection with the diagnostic interface 102 through the sixth communication port of the diagnostic connector 103 and the third communication port of the diagnostic interface 102, and the diagnostic connector 103 establishes a communication connection with the vehicle to-be-diagnosed 104 through the seventh communication port of the diagnostic connector 103 and the OBD port of the vehicle to-be-diagnosed 104. The first communication link is formed among the first communication port, the fifth communication port, and the seventh communication port. The second communication link is formed among the second communication port, the fourth communication port, the third communication port, the sixth communication port, and the seventh communication port.

Exemplarily, reference can be made to FIG. 3, the method for vehicle diagnostics provided in the implementations includes S301 to S305, and details are described as follows.

At S301, a diagnostic request is obtained, where the diagnostic request includes vehicle information of the vehicle to-be-diagnosed.

It should be noted that in practical application scenarios, obtaining the diagnostic request generally refers to a process that a user determines a specific vehicle model through the diagnostic device, including automatically reading a vehicle model by the diagnostic device or determining the vehicle model by the user through a selection operation.

At S302, a communication protocol which is applied in the vehicle to-be-diagnosed is determined according to the vehicle information.

In the implementations, the vehicle information of the vehicle to-be-diagnosed includes the vehicle model, and a mapping relationship exists between vehicle models of the vehicles to-be-diagnosed and diagnostic protocols which can be applied in the vehicles to-be-diagnosed. When the vehicle model of the vehicle to-be-diagnosed is determined, protocols which can be applied in the vehicle to-be-diagnosed can be determined. Specifically, most existing vehicle models support the CAN protocol, some vehicle models, such as Bayerische Motoren Werke (BMW) vehicle models, support the CAN protocol and the DoIP protocol. Of course, some vehicle models only support the DoIP protocol.

At S303, a diagnostic instruction is obtained, where the diagnostic instruction includes a diagnostic function instruction and a communication protocol corresponding to the diagnostic function instruction.

It should be understood that the diagnostic function instruction is a diagnostic function instruction for the vehicle to-be-diagnosed which is selected by the user through a diagnostic operation interface. Specifically, in the implementations, the communication protocol which can be applied in the vehicle to-be-diagnosed includes the CAN communication protocol and/or the DoIP communication protocol, correspondingly, the user can select to trigger one diagnostic function instruction or simultaneously trigger two diagnostic function instructions, where one diagnostic power supply instruction corresponds to one kind of communication protocol. Specifically, the diagnostic function instruction is implemented as one diagnostic function instruction, which indicates that one diagnostic function, such as fault code reading or dataflow reading, etc., is correspondingly performed. The diagnostic function instruction is implemented as two diagnostic function instructions, specifically, which includes a first diagnostic function instruction and a second diagnostic function. Correspondingly, the two diagnostic function instructions need perform two diagnostic functions, such as the fault code reading and online programming.

At S304, a communication link corresponding to the diagnostic function instruction is determined, according to the communication protocol corresponding to the diagnostic function instruction.

In some implementations, when the diagnostic function instruction is implemented as one diagnostic function instruction, the communication link corresponding to the diagnostic function instruction is determined according to the communication protocol corresponding to the diagnostic function instruction specifically as follows. When the communication protocol corresponding to the diagnostic function instruction is the DoIP communication protocol, the communication link corresponding to the diagnostic function instruction is determined to be the first communication link; in this case, the diagnostic function instruction is sent to the vehicle to-be-diagnosed through the communication link corresponding to the diagnostic function instruction specifically as follows. The diagnostic function instruction is sent to the vehicle to-be-diagnosed through the first communication link. In some specific application scenarios, when the vehicle to-be-diagnosed is a vehicle of vehicle model A and only supports the DoIP communication protocol, the communication protocol corresponding to the diagnostic function instruction, such as the fault code reading or the dataflow reading, etc., for performing diagnostics on the vehicle to-be-diagnosed is the DoIP communication protocol. In this case, the communication link corresponding to the diagnostic function instruction is determined to be the first communication link.

When the communication protocol corresponding to the diagnostic function instruction is the CAN communication protocol, the communication link corresponding to the diagnostic function instruction is determined to be the second communication link; in this case, the diagnostic function instruction is sent to the vehicle to-be-diagnosed through the communication link corresponding to the diagnostic function instruction specifically as follows. The diagnostic function instruction is sent to the vehicle to-be-diagnosed through the second communication link. In some specific application scenarios, for example, when the vehicle to-be-diagnosed is a vehicle of vehicle model B and only supports the CAN communication protocol, the communication protocol corresponding to the diagnostic function instruction, such as the fault code reading or the dataflow reading, etc., for performing diagnostics on the vehicle to-be-diagnosed is the CAN communication protocol. In this case, the communication link corresponding to the diagnostic function instruction is determined to be the second communication link.

Exemplarily, when the diagnostic function instruction supports both the CAN communication protocol and the DoIP communication protocol, the communication link corresponding to the diagnostic function instruction is determined to be the first communication link if the diagnostic function instruction needs online resource support of a server, and the communication link corresponding to the diagnostic function instruction is determined to be the second communication link if the diagnostic function instruction needs no online resource support of the server. In this case, the diagnostic function instruction is sent to the vehicle to-be-diagnosed through the communication link corresponding to the diagnostic function instruction specifically as follows. The diagnostic function instruction is sent to the vehicle to-be-diagnosed through a determined communication link.

In some specific application scenarios, for example, when the vehicle to-be-diagnosed is a vehicle of vehicle model C and supports both the CAN communication protocol and the DoIP communication protocol, a specific communication link needs to be determined according to whether the diagnostic function instruction needs the online resource support of the server. For example, for the vehicle to-be-diagnosed of vehicle model C, the fault code reading and the dataflow reading need no online resource support of the server, such that a communication link corresponding to a diagnostic fault instruction of the fault code reading or the dataflow reading is determined to be the second communication link, and the online programming function needs the online resource support of the server, such that a communication link corresponding to the diagnostic fault instruction of the online programming is determined to be the first communication link. Of course, in some other application scenarios, some diagnostic function instructions, such as vehicle safety verification, vehicle system configuration, etc., also need the online resource support of the server. In this case, communication links corresponding to these diagnostic function instructions should also be determined to be the first communication link.

In some implementations, when the diagnostic function instruction is implemented as two diagnostic function instructions, a communication protocol corresponding to a first diagnostic function instruction is the DoIP communication protocol, and a communication protocol corresponding to a second diagnostic function instruction is the CAN communication protocol. The communication link corresponding to the diagnostic function instruction is determined according to the communication protocol corresponding to the diagnostic function instruction specifically as follows. The first communication link is assigned to a communication link corresponding to the first diagnostic function instruction, and the second communication link is assigned to a communication link corresponding to the second diagnostic function instruction.

In these implementations, the diagnostic function instruction is sent to the vehicle to-be-diagnosed through the communication link corresponding to the diagnostic function instruction specifically as follows. The first diagnostic function instruction is sent to the vehicle to-be-diagnosed through the first communication link, and the second diagnostic function instruction is sent to the vehicle to-be-diagnosed through the second communication link. In some specific application scenarios, for example, when the vehicle to diagnosed is a vehicle of vehicle model D, the communication protocol corresponding to a diagnostic function instruction of the dataflow reading of the vehicle to-be-diagnosed is the CAN communication protocol, and the communication protocol corresponding to a diagnostic function instruction of the vehicle safety verification is the DoIP communication protocol, therefore, in this case, the communication link corresponding to the diagnostic function instruction of the dataflow reading is determined to be the second communication link, and the communication link corresponding to the diagnostic function instruction of the vehicle safety verification is determined to be the first communication link. Then a vehicle-safety-verification instruction is sent to the vehicle to-be-diagnosed through the first communication link, and a dataflow reading instruction is sent to the vehicle to-be-diagnosed through the second communication link. Through two communication links supporting different communication protocols, different diagnostic instructions are sent to the vehicle to-be-diagnosed, which improves efficiency of vehicle diagnostics.

In some implementations, when the diagnostic function instruction is implemented as two diagnostic function instructions and diagnostic function instructions each support the CAN communication protocol and the DoIP communication protocol, the communication link corresponding to the diagnostic function instruction is determined according to the communication protocol corresponding to the diagnostic function instruction specifically as follows. A diagnostic function instruction needing online resource support of a server is determined to be a third diagnostic function instruction, and a diagnostic function instruction needing no online resource support of the server is determined to be a fourth diagnostic function instruction. The first communication link is assigned to a communication link corresponding to the third diagnostic function instruction, and the second communication link is assigned to a communication link corresponding to the fourth diagnostic function instruction. The diagnostic function instruction is sent to the vehicle to-be-diagnosed through the communication link corresponding to the diagnostic function instruction specifically as follows. The third diagnostic function instruction is sent to the vehicle to-be-diagnosed through the first communication link, and the fourth diagnostic function instruction is sent to the vehicle to-be-diagnosed through the second communication link. In some specific application scenarios, when the vehicle to-be-diagnosed is a vehicle of vehicle model E and the diagnostic function instructions, such as fault code reading, fault code clearing, dataflow reading, action testing, online programming, vehicle safety verification, etc., of the vehicle to-be-diagnosed of vehicle model E support both the DoIP communication protocol and the CAN communication protocol, communication links of the diagnostic function instructions, such as the online programming, the vehicle safety verification, etc., needing the online resource support of the server are preferentially determined to be the first communication link, and communication links of the diagnostic function instructions, such as the fault code reading, the fault code clearing, the dataflow reading, the action testing, etc., needing no online resource support of the server are determined to be second communication links. In other words, if the two diagnostic function instructions include one diagnostic function instruction needing the online resource support of the server and another diagnostic function instruction needing no online resource support of the server simultaneously, the communication link of the diagnostic function instruction needing the online resource support of the server is determined to be the first communication link, and the communication link of the diagnostic function instruction needing no online resource support of the server is determined to be the second communication link. Of course, in some other application scenarios, if both of the two diagnostic function instructions only support the DoIP communication protocol, the diagnostic function instructions selected in sequence are sent to the vehicle to-be-diagnosed through the first communication link. If both of the two diagnostic function instructions only support the CAN communication protocol, the diagnostic function instructions selected in sequence are sent to the vehicle to-be-diagnosed through the second communication link. The diagnostic function instruction needing the online resource support of the server and the diagnostic function instruction needing no online resource support of the server are sent through different communication links, such that efficiency of vehicle diagnostics is effectively improved.

It should be noted that in the implementations of the present disclosure, a network card is disposed between the fifth communication port and the seventh communication port, and the network card is coupled with a system bus of the diagnostic device through the fifth communication port and the first communication port and the network card is coupled with the OBD port of the vehicle to-be-diagnosed through the seventh communication port, to form the first communication link.

It should be understood that in order to form the first communication link, the network card needs to be driven to be effective first, and an IP address of the network card and an IP address of the vehicle to-be-diagnosed are on a same network segment.

Therefore, the method further includes the following operations. Before the diagnostic function instruction is sent to the vehicle to-be-diagnosed through the first communication link, a DHCP service or an AUTO-IP service is activated once the network card is monitored to be driven to be effective, and the IP address of the network card and the IP address of the vehicle to-be-diagnosed are assigned through the DHCP service or the AUTO-IP service, where the IP address of the network card and the IP address of the vehicle to-be-diagnosed are on the same network segment.

Specifically, the DHCP service or the AUTO-IP service is activated, once the network card is monitored to be driven to be effective as follows. A DoIP network-control-service function built in the diagnostic device is invoked to monitor a state of the network card. A broadcast which is indicative of activating the DHCP service or the AUTO-IP service is sent to the DoIP network-control-service function, once the network card is monitored to be driven to be effective. The DoIP network-control-service function is invoked to activate the DHCP service or the AUTO-IP service.

Specifically, upon the network card being driven to be effective, registration success information of the network card is generated on the diagnostic device. Upon detecting the registration success information of the network card through the DoIP network-control-service function, the diagnostic device assigns a default website address to the network card and establishes a routing table. Furthermore, the diagnostic device sends a broadcast which is indicative of activating the DHCP service to the DoIP network-control-service function.

It should be understood that an IP address is needed to activate the DHCP service itself, and after the diagnostic connector is coupled, and a vehicle DoIP node will apply to the DHCP service for an IP address and usually try to be coupled for three times. If the vehicle DoIP node is coupled successfully, the diagnostic device uses the DHCP service to assign the IP address of the vehicle DoIP node, such that the network card and the vehicle DoIP node are on the same network segment. If the vehicle DoIP node fails to apply to the DHCP service for the IP address, the vehicle DoIP node will assign an IP address to itself according to the AUTO-IP protocol. In this case, the diagnostic device and the vehicle DoIP node are not on the same network segment, and the diagnostic device fails to perform data communication with the vehicle to-be-diagnosed through the DoIP communication protocol. In addition, after failure, the diagnostic device stops the DHCP service and activate the AUTO-IP service, and also assigns an IP address to the network card according to the AUTO-IP protocol, such that the network card and the vehicle DoIP node are on the same network segment.

It should be understood that the diagnostic device is simultaneously provided with two network devices, which are a wireless network card and a network card externally coupled with the diagnostic connector respectively, therefore, the network card externally coupled with the diagnostic connector must be configured with the routing table, such that DoIP protocol data can be transmitted through this external network card.

It should be understood that after the DoIP network-control-service function is invoked to activate the DHCP service or the AUTO-IP service, a DoIP diagnostic function may also be displayed in a visualization region.

It should be understood that if the network card fails to drive, the DHCP service or the AUTO-IP service is not needed to activate. Correspondingly, in the implementations, once driving failure of the network card is monitored, a broadcast which is indicative of stopping the DHCP service or the AUTO-IP service is sent to the DoIP network-control-service function, and the DoIP network-control-service function is invoked to stop the DHCP service or the AUTO-IP service.

It should be noted that in the present disclosure, an Android broadcast mechanism is adopted to invoke a DoIP network-control-service function built in Android system. But not limited to this manner, the DoIP network-control-service function built in Android system may also be invoked through a basic binder mechanism.

At S305, the diagnostic function instruction is sent to the vehicle to-be-diagnosed through the communication link corresponding to the diagnostic function instruction, feedback data is obtained from the vehicle to-be-diagnosed, and diagnostics is performed.

It should be understood that when the diagnostic function instruction is implemented as one diagnostic function instruction, the communication link corresponding to the diagnostic function instruction may be the first communication link or the second communication link, and the diagnostic function instruction is sent to the vehicle to-be-diagnosed through the first communication link or the second communication link corresponding to the diagnostic function instruction. When the diagnostic function instruction is implemented as two diagnostic function instructions, the communication link corresponding to the diagnostic function instruction includes the first communication link and the second communication link. For example, it is assumed that a diagnostic function corresponding to the first diagnostic function instruction is the fault code reading, the communication link corresponding to the first diagnostic function instruction is the first communication link, and the first communication link supports the CAN communication protocol; and a diagnostic function corresponding to the second diagnostic function instruction is the online programming, the communication link corresponding to the second diagnostic function instruction is the second communication link, and the second communication link supports the DoIP communication protocol. Correspondingly, the first diagnostic function instruction is sent through the first communication link and the second diagnostic function instruction is sent through the second communication link, such that the fault code reading and the online programming are completed simultaneously, and efficiency of vehicle diagnostics is improved.

According to the above analysis, in the method for vehicle diagnostics provided in the implementations of the present disclosure, the diagnostic request which includes the vehicle information of the vehicle to-be-diagnosed is obtained, and the communication protocol which can be applied in the vehicle to-be-diagnosed is determined according to the vehicle information. The diagnostic instruction which includes the diagnostic function instruction and the communication protocol corresponding to the diagnostic function instruction is obtained, and the communication link corresponding to the diagnostic function instruction is determined according to the communication protocol corresponding to the diagnostic function instruction. Then the diagnostic function instruction is sent to the vehicle to-be-diagnosed through the communication link corresponding to the diagnostic function instruction, the feedback data is obtained from the vehicle to-be-diagnosed, and diagnostics is performed. The method solves limitations in a process of vehicle diagnostics, and effectively improves adaptability of vehicle diagnostics.

It should be understood that in the above implementations, the magnitude of a sequence number of each process does not mean an order of execution, and the order of execution of each process should be determined by its function and an internal logic and shall not constitute any limitation to an implementation process of implementations.

Based on the method for vehicle diagnostics provided in the above implementations, the implementations of the present disclosure further provide device implementations for realizing the above method implementations.

Figure 4:
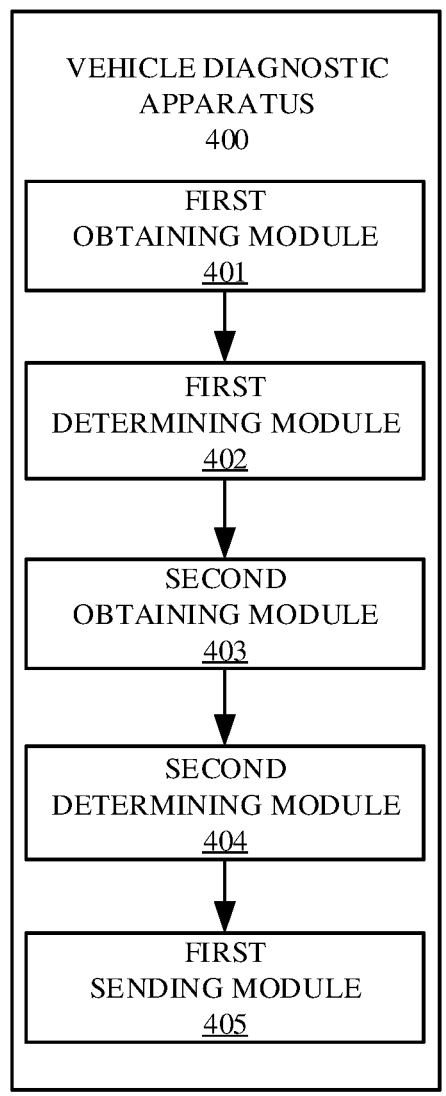
FIG. 4 is a schematic view illustrating a vehicle diagnostic apparatus provided in the implementations of the present disclosure.

Reference can be made to FIG. 4, which is a schematic view illustrating a vehicle diagnostic apparatus provided in the implementations of the present disclosure. Each included model is configured to perform each step in the implementations corresponding to FIG. 3. For details, reference can be made to the related description in the implementations corresponding to FIG. 3. For ease of illustration, only parts related to this implementation are illustrated. It should be noted that a vehicle diagnostic apparatus 400 includes a first communication port and a second communication port (not illustrated in FIG. 4), the vehicle diagnostic apparatus 400 is configured to establish a communication connection with a diagnostic connector through the first communication port and a fifth communication port of the diagnostic connector, and the vehicle diagnostic apparatus 400 is configured to establish a communication connection with a diagnostic interface through the second communication port and a fourth communication port of the diagnostic interface. The diagnostic connector is configured to establish a communication connection with the diagnostic interface through a sixth communication port of the diagnostic connector and a third communication port of the diagnostic interface, and the diagnostic connector is configured to establish a communication connection with a vehicle to-be-diagnosed through a seventh communication port of the diagnostic connector and an OBD port of the vehicle to-be-diagnosed. A first communication link is formed among the first communication port, the fifth communication port, and the seventh communication port. A second communication link is formed among the second communication port, the fourth communication port, the third communication port, the sixth communication port, and the seventh communication port. It can be seen from FIG. 4 that the vehicle diagnostic apparatus 400 includes a first obtaining module 401, a first determining module 402, a second obtaining module 403, a second determining module 404, and a first sending module 405. The first obtaining module 401 is configured to obtain a diagnostic request, where the diagnostic request includes vehicle information of the vehicle to-be-diagnosed. The first determining module 402 is configured to determine a communication protocol which can be applied in the vehicle to-be-diagnosed according to the vehicle information. The second obtaining module 403 is configured to obtain a diagnostic instruction, where the diagnostic instruction includes a diagnostic function instruction and a communication protocol corresponding to the diagnostic function instruction. The second determining module 404 is configured to determine a communication link corresponding to the diagnostic function instruction according to the communication protocol corresponding to the diagnostic function instruction. The first sending module 405 is configured to send the diagnostic function instruction to the vehicle to-be-diagnosed through the communication link corresponding to the diagnostic function instruction, obtain feedback data from the vehicle to-be-diagnosed, and perform diagnostics.

In the implementations, the communication protocol which can be applied in the vehicle to-be-diagnosed includes a CAN communication protocol and/or a DoIP communication protocol, and the diagnostic function instruction is implemented as one diagnostic function instruction. The second determining module 404 includes a first determining unit and a second determining unit. When the communication protocol corresponding to the diagnostic function instruction is the DoIP communication protocol, the first determining unit is configured to determine the communication link corresponding to the diagnostic function instruction to be the first communication link; in this case, the first sending module 405 configured to send the diagnostic function instruction to the vehicle to-be-diagnosed through the communication link corresponding to the diagnostic function instruction is specifically configured to send the diagnostic function instruction to the vehicle to-be-diagnosed through the first communication link. When the communication protocol corresponding to the diagnostic function instruction is the CAN communication protocol, the second determining unit is configured to determine the communication link corresponding to the diagnostic function instruction to be the second communication link; in this case, the first sending module 405 configured to send the diagnostic function instruction to the vehicle to-be-diagnosed through the communication link corresponding to the diagnostic function instruction is specifically configured to send the diagnostic function instruction to the vehicle to-be-diagnosed through the second communication link. When the diagnostic function instruction supports both the CAN communication protocol and the DoIP communication protocol, the second determining module 404 is configured to determine the communication link corresponding to the diagnostic function instruction to be the first communication link if the diagnostic function instruction needs online resource support of a server, and determine the communication link corresponding to the diagnostic function instruction to be the second communication link if the diagnostic function instruction needs no online resource support of the server. In this case, the first sending module 405 configured to send the diagnostic function instruction to the vehicle to-be-diagnosed through the communication link corresponding to the diagnostic function instruction is specifically configured to send the diagnostic function instruction to the vehicle to-be-diagnosed through a determined communication link.

In the implementations, the communication protocol which can be applied in the vehicle to-be-diagnosed includes the CAN communication protocol and/or the DoIP communication protocol, and the diagnostic function instruction is implemented as two diagnostic function instructions, where a communication protocol corresponding to a first diagnostic function instruction is the DoIP communication protocol, and a communication protocol corresponding to a second diagnostic function instruction is the CAN communication protocol. The second determining module 404 is specifically configured to assign the first communication link to a communication link corresponding to the first diagnostic function instruction, and assign the second communication link to a communication link corresponding to the second diagnostic function instruction. Correspondingly, the first sending module 405 is specifically configured to send the first diagnostic function instruction to the vehicle to-be-diagnosed through the first communication link, and send the second diagnostic function instruction to the vehicle to-be-diagnosed through the second communication link.

In the implementations, when the diagnostic function instruction is implemented as two diagnostic function instructions and diagnostic function instructions each support the CAN communication protocol and the DoIP communication protocol, the second determining module 404 is specifically configured to determine a diagnostic function instruction needing online resource support of a server to be a third diagnostic function instruction, and determine a diagnostic function instruction needing no online resource support of the server to be a fourth diagnostic function instruction. The second determining module 404 is further configured to assign the first communication link to a communication link corresponding to the third diagnostic function instruction, and assign the second communication link to a communication link corresponding to the fourth diagnostic function instruction.

Correspondingly, the first sending module 405 is specifically configured to send the third diagnostic function instruction to the vehicle to-be-diagnosed through the first communication link, and send the fourth diagnostic function instruction to the vehicle to-be-diagnosed through the second communication link.

In the implementations, a network card is disposed between the fifth communication port and the seventh communication port, and the network card is coupled with a system bus of the diagnostic device through the fifth communication port and the first communication port and the network card is coupled with the OBD port of the vehicle to-be-diagnosed through the seventh communication port, to form the first communication link. The vehicle diagnostic apparatus 400 further includes an activating module and an assigning module. The activating module is configured to activate a DHCP service or an AUTO-IP service, upon monitoring that the network card is driven to be effective. The assigning module is configured to assign an IP address of the network card and an IP address of the vehicle to-be-diagnosed through the DHCP service or the AUTO-IP service, where the IP address of the network card and the IP address of the vehicle to-be-diagnosed are on a same network segment.

In the implementations, the activating module includes a first invoking unit, a sending unit, and a second invoking unit. The first invoking unit is configured to invoke a DoIP network-control-service function built in the diagnostic device to monitor a state of the network card. The sending unit is configured to send a broadcast which is indicative of activating the DHCP service or the AUTO-IP service to the DoIP network-control-service function, upon monitoring that the network card is driven to be effective. The second invoking unit is configured to invoke the DoIP network-control-service function to activate the DHCP service or the AUTO-IP service.

In the implementations, the vehicle diagnostic apparatus 400 further includes a display module, and the display module is configured to display a DoIP diagnostic function in a visualization region.

In the implementations, the vehicle diagnostic apparatus 400 further includes a second sending module and an invoking module. The second sending module is configured to send a broadcast which is indicative of stopping the DHCP servicer or the AUTO-IP service to the DoIP network-control-service function, upon monitoring driving failure of the network card. The invoking module is configured to invoke the DoIP network-control-service function to stop the DHCP service or the AUTO-IP service.

It should be noted that information interaction, execution processes, etc., among the above modules are based on a same concept as the method implementation illustrated in FIG. 3 of the present disclosure. For specific functions and technical effects, reference can be made to the method implementation, which will not be repeated here.

Figure 5:
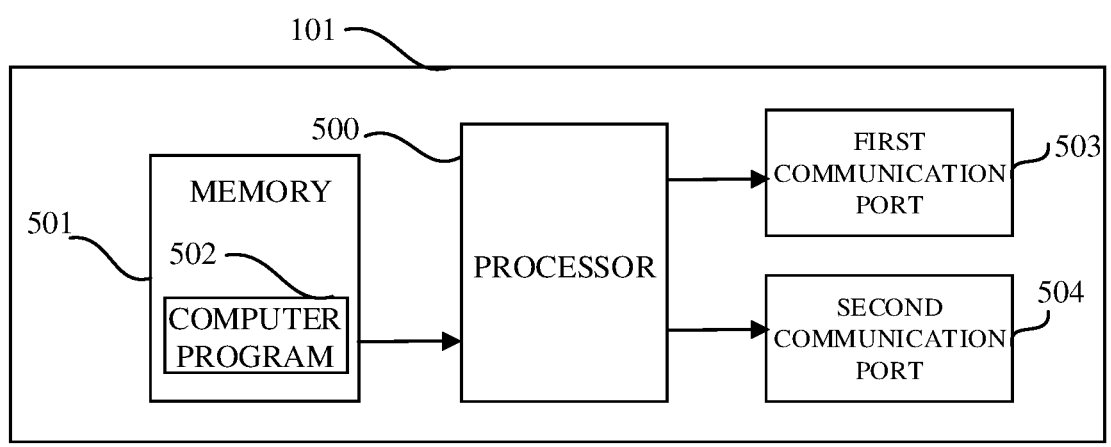
FIG. 5 is a schematic view illustrating a diagnostic device provided in the implementations of the present disclosure.

Reference can be made to FIG. 5, which is a schematic view illustrating a diagnostic device provided in the implementations of the present disclosure. A diagnostic device 101 of the implementations includes a processor 500, a memory 501, and a computer program 502 stored in the memory 501 and operable on the processor 500 such as a vehicle diagnostic program, a first communication port 503, and a second communication port 504. The processor 500 is configured to implement the following operations when executing the computer program 502. The processor 500 is configured to obtain a diagnostic request, where the diagnostic request includes vehicle information of the vehicle to-be-diagnosed. The processor 500 is further configured to determine a communication protocol which can be applied in the vehicle to-be-diagnosed according to the vehicle information. The processor 500 is further configured to obtain a diagnostic instruction, where the diagnostic instruction includes a diagnostic function instruction and a communication protocol corresponding to the diagnostic function instruction. The processor 500 is further configured to determine a communication link corresponding to the diagnostic function instruction according to the communication protocol corresponding to the diagnostic function instruction. The processor 500 is further configured to send the diagnostic function instruction to the vehicle to-be-diagnosed through the communication link corresponding to the diagnostic function instruction, obtain feedback data from the vehicle to-be-diagnosed, and perform diagnostics.

Optionally, the communication protocol which can be applied in the vehicle to-be-diagnosed includes a CAN communication protocol and/or a DoIP communication protocol, and the diagnostic function instruction is implemented as one diagnostic function instruction. The processor 500 configured to determine the communication link corresponding to the diagnostic function instruction according to the communication protocol corresponding to the diagnostic function instruction is specifically configured to perform the following operations. When the communication protocol corresponding to the diagnostic function instruction is the DoIP communication protocol, the processor 500 is configured to determine the communication link corresponding to the diagnostic function instruction to be the first communication link; in this case, the processor 500 configured to send the diagnostic function instruction to the vehicle to-be-diagnosed through the communication link corresponding to the diagnostic function instruction is specifically configured to send the diagnostic function instruction to the vehicle to-be-diagnosed through the first communication link. When the communication protocol corresponding to the diagnostic function instruction is the CAN communication protocol, the processor 500 is configured to determine the communication link corresponding to the diagnostic function instruction to be the second communication link; in this case, the processor 500 configured to send the diagnostic function instruction to the vehicle to-be-diagnosed through the communication link corresponding to the diagnostic function instruction is specifically configured to send the diagnostic function instruction to the vehicle to-be-diagnosed through the second communication link. When the diagnostic function instruction supports both the CAN communication protocol and the DoIP communication protocol, the processor 500 is configured to determine the communication link corresponding to the diagnostic function instruction to be the first communication link if the diagnostic function instruction needs online resource support of a server, and determine the communication link corresponding to the diagnostic function instruction to be the second communication link if the diagnostic function instruction needs no online resource support of the server. In this case, the processor 500 configured to send the diagnostic function instruction to the vehicle to-be-diagnosed through the communication link corresponding to the diagnostic function instruction is specifically configured to send the diagnostic function instruction to the vehicle to-be-diagnosed through a determined communication link.

Optionally, the communication protocol which can be applied in the vehicle to-be-diagnosed includes the CAN communication protocol and/or the DoIP communication protocol, and the diagnostic function instruction is implemented as two diagnostic function instructions, where a communication protocol corresponding to a first diagnostic function instruction is the DoIP communication protocol, and a communication protocol corresponding to a second diagnostic function instruction is the CAN communication protocol. The processor 500 configured to determine the communication link corresponding to the diagnostic function instruction according to the communication protocol corresponding to the diagnostic function instruction is specifically configured to assign the first communication link to a communication link corresponding to the first diagnostic function instruction, and assign the second communication link to a communication link corresponding to the second diagnostic function instruction. The processor 500 configured to send the diagnostic function instruction to the vehicle to-be-diagnosed through the communication link corresponding to the diagnostic function instruction is specifically configured to send the first diagnostic function instruction to the vehicle to-be-diagnosed through the first communication link, and send the second diagnostic function instruction to the vehicle to-be-diagnosed through the second communication link.

Optionally, the communication protocol which can be applied in the vehicle to-be-diagnosed includes the CAN communication protocol and/or the DoIP communication protocol, the diagnostic function instruction is implemented as two diagnostic function instructions, and diagnostic function instructions each support the CAN communication protocol and the DoIP communication protocol. The processor 500 configured to determine the communication link corresponding to the diagnostic function instruction according to the communication protocol corresponding to the diagnostic function instruction is specifically configured to perform the following operations. The processor 500 is configured to determine a diagnostic function instruction needing online resource support of a server to be a third diagnostic function instruction, and determine a diagnostic function instruction needing no online resource support of the server to be a fourth diagnostic function instruction. The processor 500 is further configured to assign the first communication link to a communication link corresponding to the third diagnostic function instruction, and assign the second communication link to a communication link corresponding to the fourth diagnostic function instruction. The processor 500 configured to send the diagnostic function instruction to the vehicle to-be-diagnosed through the communication link corresponding to the diagnostic function instruction is specifically configured to send the third diagnostic function instruction to the vehicle to-be-diagnosed through the first communication link, and send the fourth diagnostic function instruction to the vehicle to-be-diagnosed through the second communication link.

Optionally, a network card is disposed between the fifth communication port and the seventh communication port, and the network card is coupled with a system bus of the diagnostic device 101 through the fifth communication port and the first communication port and the network card is coupled with the OBD port of the vehicle to-be-diagnosed through the seventh communication port, to form the first communication link. The processor 500 is further configured to perform the following operations. Before sending the diagnostic function instruction to the vehicle to-be-diagnosed through the first communication link, the processor 500 is configured to activate a DHCP service or an AUTO-IP service, upon monitoring that the network card is driven to be effective, and assign an IP address of the network card and an IP address of the vehicle to-be-diagnosed through the DHCP service or the AUTO-IP service, where the IP address of the network card and the IP address of the vehicle to-be-diagnosed are on a same network segment.

Optionally, the processor 500 configured to activate the DHCP service or the AUTO-IP service, upon monitoring that the network card is driven to be effective is configured to perform the following operations. The processor 500 is configured to invoke a DoIP network-control-service function built in the diagnostic device 101 to monitor a state of the network card. The processor 500 is further configured to send a broadcast which is indicative of activating the DHCP service or the AUTO-IP service to the DoIP network-control-service function, upon monitoring that the network card is driven to be effective. The processor 500 is further configured to invoke the DoIP network-control-service function to activate the DHCP service or the AUTO-IP service.

Optionally, the processor 500 is further configured to perform the following operations. After invoking the DoIP network-control-service function to activate the DHCP service or the AUTO-IP service, the processor 500 is configured to display a DoIP diagnostic function in a visualization region.

Optionally, the processor 500 is further configured to perform the following operations. Before sending the diagnostic function instruction to the vehicle to-be-diagnosed through the first communication link, the processor 500 is configured to send a broadcast which is indicative of stopping the DHCP servicer or the AUTO-IP service to the DoIP network-control-service function, upon monitoring driving failure of the network card, and invoke the DoIP network-control-service function to stop the DHCP service or the AUTO-IP service.

Or the processor 500 is configured to perform functions of each module/unit in the implementations of the above FIG. 4 when executing the computer program 502.

Exemplarily, the computer program 502 may be divided into one or more modules/units, which are stored in the memory 501 and executed by the processor 500 to complete the present disclosure. The one or more modules/units may be a series of computer-program-instruction segments capable of completing specific functions. The instruction segments are used to describe an execution process of the computer program 502 in the diagnostic device 101. For example, the computer program 502 may be divided into a first sending module, and for specific functions of the first sending module, reference can be made to related description in the implementations corresponding to FIG. 4, which will not be repeated here.

The diagnostic device 101 may include, but is not limited to, the processor 500 and the memory 501. Those skilled in the art may understand that, FIG. 5 is only an example of the diagnostic device 101 and does not limit the diagnostic device 101. The diagnostic device 101 may include more or less components than those illustrated in FIG. 5, or have certain components combined, or different components. For example, the diagnostic device 101 may further include an input/output device, a network access device, a bus line, or the like.

The processor 500 may be a central processing unit (CPU), or other general-purpose processors (GPPs), a digital signal processor (DSP), an application specific integrated circuit (ASIC), a field-programmable gate array (FPGA), or other programmable logic components, a discrete gate or transistor logic component, a discrete hardware assembly, or the like. The GPPs may be microprocessors, any conventional processors, or the like.

The memory 501 may be an internal storage unit of the diagnostic device 101, such as a hard disk or memory of the diagnostic device 101. The memory 501 may also be an external storage device of the diagnostic device 101, such as a plug-in hard disk, a smart media card (SMC), a secure digital (SD) card, a flash card, or the like, equipped in the diagnostic device 101. Furthermore, the memory 501 may also include both the internal storage unit and the external storage device of the diagnostic device 101. The memory 501 may be configured to store the computer program 502 and other programs and data supported by the diagnostic device 101. The memory 501 may further be configured to temporarily store data which has been output or will be output.

A computer-readable storage medium is provided in the implementations of the present disclosure. The computer-readable storage medium stores computer programs. When a computer program product runs on a software management device, the software management device is caused to perform the operations of the above vehicle diagnostic methods.

In the above implementations, the description of each implementation has its own emphasis. For the parts not described or recorded in detail in a certain implementation, reference may be made to the related description in other implementations.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on specific applications and design constraints of technical solutions. Those skilled in the art may use different methods to implement the described functions for each specific application, but such implementation should not be regarded as lying beyond the scope of the present disclosure.

The above illustrations are only used to illustrate technical solutions of the present disclosure, but not intended to limit the present disclosure. Although the present disclosure has been described in detail with reference to the above implementations, those of ordinary skills in the art should understand that they can still modify the technical solutions recorded in each above implementation, or perform equivalent substitutions on some of the technical features therein; and such modifications or substitutions do not make the essence of the corresponding technical solution depart from the spirit and scope of the technical solution of each implementation of the present disclosure, and shall fall within the protection scope of the present disclosure.

What is claimed is:

1. A method for vehicle diagnostics, applicable to a diagnostic device, wherein the diagnostic device is comprised in a vehicle diagnostic system comprising the diagnostic device, a diagnostic interface, and a diagnostic connector, wherein the diagnostic device comprises a first communication port and a second communication port, the diagnostic interface comprises a third communication port and a fourth communication port, the diagnostic connector comprises a fifth communication port, a sixth communication port, and a seventh communication port; the diagnostic connector establishes a communication connection with the diagnostic device through the fifth communication port and the first communication port; the diagnostic connector establishes a communication connection with the diagnostic interface through the sixth communication port and the third communication port; the diagnostic connector establishes a communication connection with a vehicle to-be-diagnosed through the seventh communication port and an on-board diagnostics (OBD) port of the vehicle to-be-diagnosed; the diagnostic interface establishes a communication connection with the diagnostic device through the fourth communication port and the second communication port; wherein a first communication link is formed among the first communication port, the fifth communication port, and the seventh communication port, and a second communication link is formed among the second communication port, the fourth communication port, the third communication port, the sixth communication port, and the seventh communication port, and the method comprises:

obtaining, by the diagnostic device, a diagnostic request, the diagnostic request comprising vehicle information of the vehicle to-be-diagnosed;

determining, by the diagnostic device, a communication protocol which is applied in the vehicle to-be-diagnosed according to the vehicle information, wherein the communication protocol which is applied in the vehicle to-be-diagnosed comprises a controller area network (CAN) communication protocol and/or a diagnostic communication over Internet protocol (DoIP) communication protocol;

obtaining, by the diagnostic device, a diagnostic instruction, the diagnostic instruction comprising a diagnostic function instruction and a communication protocol corresponding to the diagnostic function instruction, wherein the diagnostic function instruction is implemented as two diagnostic function instructions, wherein a communication protocol corresponding to a first diagnostic function instruction is the DoIP communication protocol, and a communication protocol corresponding to a second diagnostic function instruction is the CAN communication protocol;

assigning, by the diagnostic device, the first communication link to a communication link corresponding to the first diagnostic function instruction, and assigning, by the diagnostic device, the second communication link to a communication link corresponding to the second diagnostic function instruction;

sending, by the diagnostic device, the first diagnostic function instruction to the vehicle to-be-diagnosed through the first communication link and simultaneously sending, by the diagnostic device, the second diagnostic function instruction to the vehicle to-be-diagnosed through the second communication link, and obtaining, by the diagnostic device, feedback data from the vehicle to-be-diagnosed, wherein the feedback data is used to instruct the diagnostic device to perform diagnostics.

2. The method of claim 1, wherein a network card is disposed between the fifth communication port and the seventh communication port, and the network card is coupled with a system bus of the diagnostic device through the fifth communication port and the first communication port and the network card is coupled with the OBD port of the vehicle to-be-diagnosed through the seventh communication port, to form the first communication link; and the method further comprises:

before sending, by the diagnostic device, the diagnostic function instruction to the vehicle to-be-diagnosed through the first communication link,
activating, by the diagnostic device, a dynamic host configuration protocol (DHCP) service or an auto Internet protocol (AUTO-IP) service, upon monitoring that the network card is driven to be effective; and assigning, by the diagnostic device, an Internet protocol (IP) address of the network card and an IP address of the vehicle to-be-diagnosed through the DHCP service or the AUTO-IP service, wherein the IP address of the network card and the IP address of the vehicle to-be-diagnosed are on a same network segment.

3. The method of claim 2, wherein activating, by the diagnostic device, the DHCP service or the AUTO-IP service, upon monitoring that the network card is driven to be effective comprises:
invoking, by the diagnostic device, a DoIP network-control-service function built in the diagnostic device to monitor a state of the network card;
sending, by the diagnostic device, a broadcast which is indicative of activating the DHCP service or the AUTO-IP service to the DoIP network-control-service function, upon monitoring that the network card is driven to be effective; and
invoking, by the diagnostic device, the DoIP network-control-service function to activate the DHCP service or the AUTO-IP service.

4. The method of claim 3, further comprising:
after invoking, by the diagnostic device, the DoIP network-control-service function to activate the DHCP service or the AUTO-IP service,
displaying, by the diagnostic device, a DoIP diagnostic function in a visualization region.

5. The method of claim 2, further comprising:
before sending, by the diagnostic device, the diagnostic function instruction to the vehicle to-be-diagnosed through the first communication link,
sending, by the diagnostic device, a broadcast which is indicative of stopping the DHCP service or the AUTO-IP service to a DoIP network-control-service function, upon monitoring driving failure of the network card; and
invoking, by the diagnostic device, the DoIP network-control-service function to stop the DHCP service or the AUTO-IP service.

6. A diagnostic device, comprising:
a first communication port; and
a second communication port, wherein the diagnostic device is comprised in a vehicle diagnostic system comprising the diagnostic device, a diagnostic interface, and a diagnostic connector, wherein the diagnostic interface comprises a third communication port and a fourth communication port and the diagnostic connector comprises a fifth communication port, a sixth communication port, and a seventh communication port; wherein the diagnostic device is configured to establish a communication connection with the diagnostic connector through the first communication port and the fifth communication port of the diagnostic connector, and the diagnostic device is configured to establish a communication connection with the diagnostic interface through the second communication port and the fourth communication port of the diagnostic interface; the diagnostic connector is configured to establish a communication connection with the diagnostic interface through the sixth communication port of the diagnostic connector and the third communication port of the diagnostic interface, and the diagnostic connector is configured to establish a communication connection with a vehicle to-be-diagnosed through the seventh communication port of the diagnostic connector and an on-board diagnostic (OBD) port of the vehicle to-be-diagnosed; a first communication link is formed among the first communication port, the fifth communication port, and the seventh communication port; a second communication link is formed among the second communication port, the fourth communication port, the third communication port, the sixth communication port, and the seventh communication port; and the diagnostic device further comprises:
a memory configured to store a vehicle diagnostic program; and
a processor, when executing the vehicle diagnostic program, configured to:
obtain a diagnostic request, the diagnostic request comprising vehicle information of the vehicle to-be-diagnosed; wherein the communication protocol which is applied in the vehicle to-be-diagnosed comprises a controller area network (CAN) communication protocol and/or a diagnostic communication over Internet protocol (DoIP) communication protocol;
obtain a diagnostic instruction, the diagnostic instruction comprising a diagnostic function instruction and a communication protocol corresponding to the diagnostic function instruction, wherein the diagnostic function instruction is implemented as two diagnostic function instructions, and diagnostic function instructions each support the CAN communication protocol and the DoIP communication protocol;
determine a diagnostic function instruction needing online resource support of a server to be a third diagnostic function instruction, and determine a diagnostic function instruction needing no online resource support of the server to be a fourth diagnostic function instruction;
assign the first communication link to a communication link corresponding to the third diagnostic function instruction, and assign the second communication link to a communication link corresponding to the fourth diagnostic function instruction;
send the third diagnostic function instruction to the vehicle to-be-diagnosed through the first communication link and simultaneously send the fourth diagnostic function instruction to the vehicle to-be-diagnosed through the second communication link, and obtain feedback data from the vehicle to-be-diagnosed, wherein the feedback data is used to instruct the diagnostic device to perform diagnostics.

7. The diagnostic device of claim 6, wherein a network card is disposed between the fifth communication port and the seventh communication port, and the network card is coupled with a system bus of the diagnostic device through the fifth communication port and the first communication port and the network card is coupled with the OBD port of the vehicle to-be-diagnosed through the seventh communication port, to form the first communication link; and the processor is further configured to:
before sending the diagnostic function instruction to the vehicle to-be-diagnosed through the first communication link,
activate a dynamic host configuration protocol (DHCP) service or an auto Internet protocol (AUTO-IP) service, upon monitoring that the network card is driven to be effective; and
assign an Internet protocol (IP) address of the network card and an IP address of the vehicle to-be-diagnosed through the DHCP service or the AUTO-IP service, wherein the IP address of the network card and the IP address of the vehicle to-be-diagnosed are on a same network segment.

8. The diagnostic device of claim 7, wherein the processor configured to activate the DHCP service or the AUTO-IP service, upon monitoring that the network card is driven to be effective is configured to:
 invoke a DoIP network-control-service function built in the diagnostic device to monitor a state of the network card;
 send a broadcast which is indicative of activating the DHCP service or the AUTO-IP service to the DoIP network-control-service function, upon monitoring that the network card is driven to be effective; and
 invoke the DoIP network-control-service function to activate the DHCP service or the AUTO-IP service.

9. The diagnostic device of claim 8, wherein the processor is further configured to:
 after invoking the DoIP network-control-service function to activate the DHCP service or the AUTO-IP service, display a DoIP diagnostic function in a visualization region.

10. The diagnostic device of claim 7, wherein the processor is further configured to:
 before sending the diagnostic function instruction to the vehicle to-be-diagnosed through the first communication link,
  send a broadcast which is indicative of stopping the DHCP servicer or the AUTO-IP service to a DoIP network-control-service function, upon monitoring driving failure of the network card; and
  invoke the DoIP network-control-service function to stop the DHCP service or the AUTO-IP service.

11. A non-transitory computer-readable storage medium for storing a computer program, wherein the computer program causes a computer to:
 obtain a diagnostic request, the diagnostic request comprising vehicle information of a vehicle to-be-diagnosed;
 determine a communication protocol which is applied in the vehicle to-be-diagnosed according to the vehicle information, wherein the communication protocol which is applied in the vehicle to-be-diagnosed comprises a controller area network (CAN) communication protocol and/or a diagnostic communication over Internet protocol (DoIP) communication protocol;
 obtain a diagnostic instruction, the diagnostic instruction comprising a diagnostic function instruction and a communication protocol corresponding to the diagnostic function instruction; wherein the diagnostic function instruction is implemented as two diagnostic function instructions, wherein a communication protocol corresponding to a first diagnostic function instruction is the DoIP communication protocol, and a communication protocol corresponding to a second diagnostic function instruction is the CAN communication protocol;
 assign the first communication link to a communication link corresponding to the first diagnostic function instruction, and assign the second communication link to a communication link corresponding to the second diagnostic function instruction; and
 send the first diagnostic function instruction to the vehicle to-be-diagnosed through the first communication link and simultaneously send the second diagnostic function instruction to the vehicle to-be-diagnosed through the second communication link, and obtain feedback data from the vehicle to-be-diagnosed, wherein the feedback data is used to instruct a diagnostic device to perform diagnostics.

* * * * *